(12) United States Patent
Oehler et al.

(10) Patent No.: US 12,000,390 B2
(45) Date of Patent: Jun. 4, 2024

(54) ELECTROMECHANICALLY DRIVABLE BRAKE PRESSURE GENERATOR

(71) Applicant: Robert Bosch GmbH, Stuttgart (DE)

(72) Inventors: Claus Oehler, Karlsruhe (DE); Martin Uhlig, Ilsfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 229 days.

(21) Appl. No.: 17/620,416

(22) PCT Filed: Jun. 12, 2020

(86) PCT No.: PCT/EP2020/066269
§ 371 (c)(1),
(2) Date: Dec. 17, 2021

(87) PCT Pub. No.: WO2021/032334
PCT Pub. Date: Feb. 25, 2021

(65) Prior Publication Data
US 2022/0348178 A1    Nov. 3, 2022

(30) Foreign Application Priority Data
Aug. 19, 2019    (DE) ............... 10 2019 212 345.7

(51) Int. Cl.
*F04B 9/02* (2006.01)
*F04B 17/03* (2006.01)
(Continued)

(52) U.S. Cl.
CPC ............ *F04B 9/02* (2013.01); *F04B 17/03* (2013.01); *F16H 57/082* (2013.01); *B60T 13/168* (2013.01); *B60T 13/745* (2013.01)

(58) Field of Classification Search
CPC .......... F04B 9/02; F04B 17/03; F16H 57/082; B60T 13/168; B60T 13/745
See application file for complete search history.

(56) References Cited

U.S. PATENT DOCUMENTS 6,206,800 B1    3/2001  Kay
6,692,401 B2 *  2/2004  Hofschulte ............ F16H 1/227
                                                    475/331
(Continued)

FOREIGN PATENT DOCUMENTS

DE            10334929 A1    2/2005
DE        202005008274 U1   10/2005
(Continued)

OTHER PUBLICATIONS

English language Abstract of DE 10 2015 223507, Mayr et al. (Year: 2017).*
(Continued)

*Primary Examiner* — Charles G Freay
(74) *Attorney, Agent, or Firm* — NORTON ROSE FULBRIGHT US LLP; Gerard A. Messina

(57) ABSTRACT

An electromechanically drivable brake pressure generator for a hydraulic braking system of a vehicle. The electromechanically drivable brake pressure generator includes an electric motor for generating a input speed, a planetary gear set that is driven by the electric motor on the input side to decrease a gear ratio of the input speed, and a hydraulic module that is connected to the planetary gear set on the output side to generate a brake pressure. The planetary gear set includes stepped planets that are connected to a sun wheel of the planetary gear set on the input side and to an output component of the planetary gear set on the output side.

9 Claims, 3 Drawing Sheets

(51) Int. Cl.
  *F16H 57/08* (2006.01)
  *B60T 13/16* (2006.01)
  *B60T 13/74* (2006.01)

(56) References Cited

U.S. PATENT DOCUMENTS

| | | |
|---|---|---|
| 2002/0077213 A1 | 6/2002 | Hofschulte et al. |
| 2010/0093478 A1* | 4/2010 | Guttenberger ........ F16H 57/082 475/149 |
| 2016/0252160 A1* | 9/2016 | Lê ............................ F16H 1/46 475/331 |

FOREIGN PATENT DOCUMENTS

| | | | | |
|---|---|---|---|---|
| DE | 102010006306 A1 | 8/2011 | | |
| DE | 10 2015 223507 | * 6/2017 | ............... | H02K 7/14 |
| DE | 102016208033 A1 | 11/2017 | | |
| EP | 3379106 A1 | 9/2018 | | |
| JP | H01105039 A | 4/1989 | | |
| JP | 2000046153 A | 2/2000 | | |
| JP | 2019100460 A | 6/2019 | | |
| WO | 2012013314 A2 | 2/2012 | | |
| WO | 2018099636 A1 | 6/2018 | | |

OTHER PUBLICATIONS

International Search Report for PCT/EP2020/066269, dated Oct. 28, 2020.

\* cited by examiner

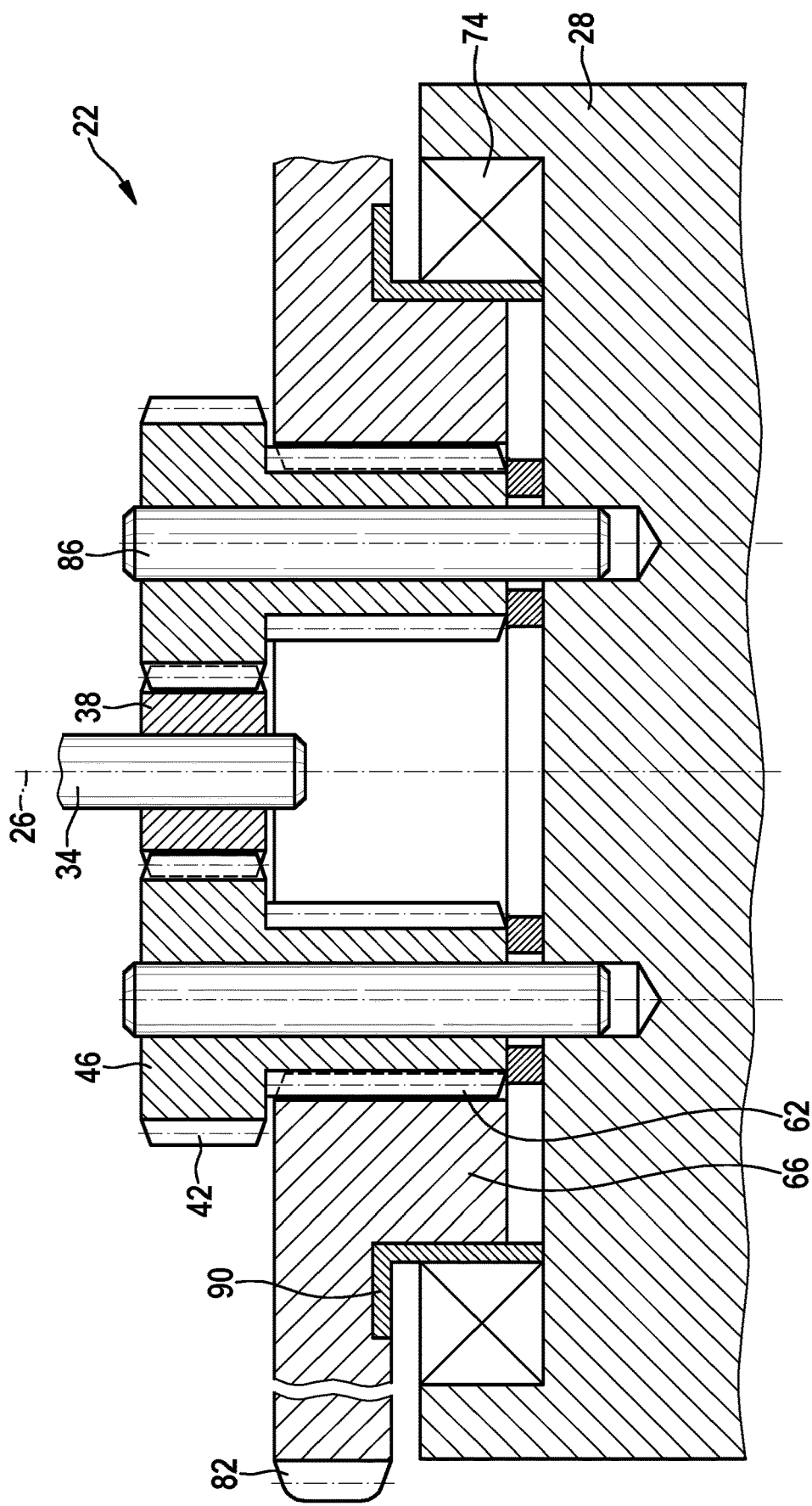

ELECTROMECHANICALLY DRIVABLE BRAKE PRESSURE GENERATOR

FIELD

The present invention relates to an electromechanically drivable brake pressure generator for a hydraulic braking system of a vehicle and a vehicle including such an electromechanically drivable brake pressure generator.

BACKGROUND INFORMATION

In most cases, the foot power of the driver is not enough to brake motor vehicles, so that these are usually equipped with a brake booster. Conventional brake boosters generally operate using a vacuum generated by the internal combustion engine. The pressure difference between the engine pressure and the ambient pressure is used to apply a boosting power in addition to the foot power of the driver.

For future driving concepts of motor vehicles, alternative brake pressure build-up devices are necessary, since the vacuum is no longer available to operate a conventional vacuum brake booster. For this purpose, the electromechanical brake pressure generators that are interesting in this case were developed.

The actuating force is generated with the aid of an electric motor that activates a movement of a hydraulic piston via a transmission in order to generate a brake pressure. Electromechanical brake pressure generators of this type are not only capable of providing a supporting power, but may also be used in brake-by-wire systems for solely providing the actuating force. For this reason, electromechanical brake pressure generators are in particular advantageous with regard to autonomous driving.

An electromechanical brake booster that boosts a pedal power introduced via a ball screw is described in PCT Patent Application No. WO 2012/013314 A2. For this purpose, a recirculating ball nut that is driven via a planetary gear set with the aid of an electric motor for the purpose of boosting the pedal power is situated at the ball screw.

SUMMARY

The present invention provides an electromechanically drivable brake pressure generator for a hydraulic braking system of a vehicle. In accordance with an example embodiment of the present invention, the electromechanically drivable brake pressure generator includes an electric motor for generating an input speed, a planetary gear set that is driven by the electric motor on the input side to decrease a gear ratio of the input speed, and a hydraulic module that is connected to the planetary gear set on the output side to generate a brake pressure. The planetary gear set includes stepped planets that are connected to a sun wheel of the planetary gear set on the input side and to an output component of the planetary gear set on the output side.

A hydraulic module in the sense of the present invention is understood to mean a module that converts the rotary movement of the planetary gear set into a movement of a hydraulic piston for the purpose of generating a brake pressure for the electromechanical brake pressure generator. This is preferably implemented via a spindle nut arrangement, via which this rotary movement is converted into a translatory movement of the hydraulic piston in a hydraulic cylinder.

The planetary gear set may have the advantage that high gear ratio is achievable, while the installation space is reduced as a result of the high performance density. In addition, a planetary gear set has a low noise behavior. As a result of the rotary degrees of freedom of the gear elements sun wheel, planet wheel, planet carrier, and annulus gear, a planetary gear set provides a considerable room for maneuver with regard to the design and the gear ratio. With the aid of a planetary gear set, a distance between the motor axis and the hydraulic axis of a hydraulic piston is additionally reduced.

A stepped planet is a planet wheel that has at least two different toothings, whose pitch diameters differ from one another. The toothings are situated in specific sections of the stepped planet. The stepped planet may have a one-part or multi-part design. In addition, a planetary gear set including stepped planets has the advantage that the number of the components may thus be reduced. In addition, stepped planets have the advantage that the volume of such a gear set is smaller as compared to alternative approaches having a comparable overall gear ratio.

In one preferred embodiment of the present invention, the output component is a planet carrier that accommodates the stepped planets. In one alternative embodiment of the present invention, the output component is an annulus gear of the planetary gear set. To achieve a rotatory movement of the planet carrier, the annulus gear is fixed. In the alternative embodiment, the planet carrier is fixed accordingly. In the case of an output via the planet carrier, a higher gear ratio may be achieved as compared to an output via the annulus gear. In contrast, if a lower gear ratio is desired, an output via the annulus gear is more advantageous. In this way, the planetary gear set may be used for different types of gear ratio by implementing small changes.

The stepped planets preferably have a bearing area, via which they are mounted in the bores of the planet carrier. The bearing area is an area of the stepped planet that is preferably situated between the toothing areas. It is particularly preferred that the material of this bearing area and/or of the bore is designed in such a way that it has a lubricating property. In this way, a rolling bearing may be dispensed with.

By mounting the stepped planet in the bore of the planet carrier, no further components are necessary, so that the installation height of the planetary gear set may be reduced. In addition, as a result of a mounting between the toothing areas an advantageous central dissipation of the loads is achieved, so that a bending moment on the planet carrier is reduced.

In one advantageous refinement of the present invention, the stepped planets are mounted via planet axles at the electric motor or at a housing part. For this purpose, the planet axles are fixedly connected to the electric motor or the housing part. As a result of such a mounting, no additional planet carrier is necessary to provide a mounting. In this way, the stepped planets may be easily and economically mounted. Since an additional planet carrier and a bearing area are dispensed with, it is possible to save installation space, so that such an electromechanical brake pressure generator is more compact.

Advantageously, the output component is mounted via a bearing that is situated between a housing part and the output component. The bearing is preferably a rolling bearing. As a result, no additional components are necessary for the mounting, so that the number of parts and the necessary installation space are reduced.

In a further advantageous embodiment of the present invention, the output component is designed as a spur wheel. The spur wheel may be rotatably fixedly connected to the output component or designed in one piece with same. In this way, further components, which would potentially have to be mounted, are not necessary between the planetary gear set and the hydraulic module. Thus, the distance between the planetary gear set and the hydraulic module may be bridged in a space-saving manner. In addition, the gear ratio is increased with the aid of such a spur wheel.

According to one advantageous embodiment of the present invention, the stepped planets and/or the sun wheel are formed from a sintered metal material. The sintered metal material has the advantage that due to the porous surface a lubricant may be provided in an improved manner, so that the wear of the components is minimized.

According to a further advantageous embodiment of the present invention, the stepped planets and/or a planet carrier and/or the annulus gear are formed from a plastic injection-molded material. The plastic injection-molded material has the advantage that it is light and easily manufacturable in various shapes. In addition, the costs for the plastic are low, so that such a brake pressure generator is manufacturable economically overall. When accordingly selecting the plastic, plastics may additionally be selected that have good tribological properties.

In order to improve a load bearing capacity and distribution of the bearing load, metal inserts are preferably inserted into the plastic material. In this way, the bearing capacity of the corresponding components may thus be economically improved.

Exemplary embodiments of the present invention are illustrated in the figures and elucidated in greater detail in the description below.

BRIEF DESCRIPTION OF THE DRAWINGS

FIG. 3 shows a second exemplary embodiment of a planetary gear set of the electromechanical brake pressure generator according to the present invention.

DETAILED DESCRIPTION OF EXAMPLE EMBODIMENTS

Figure 1:
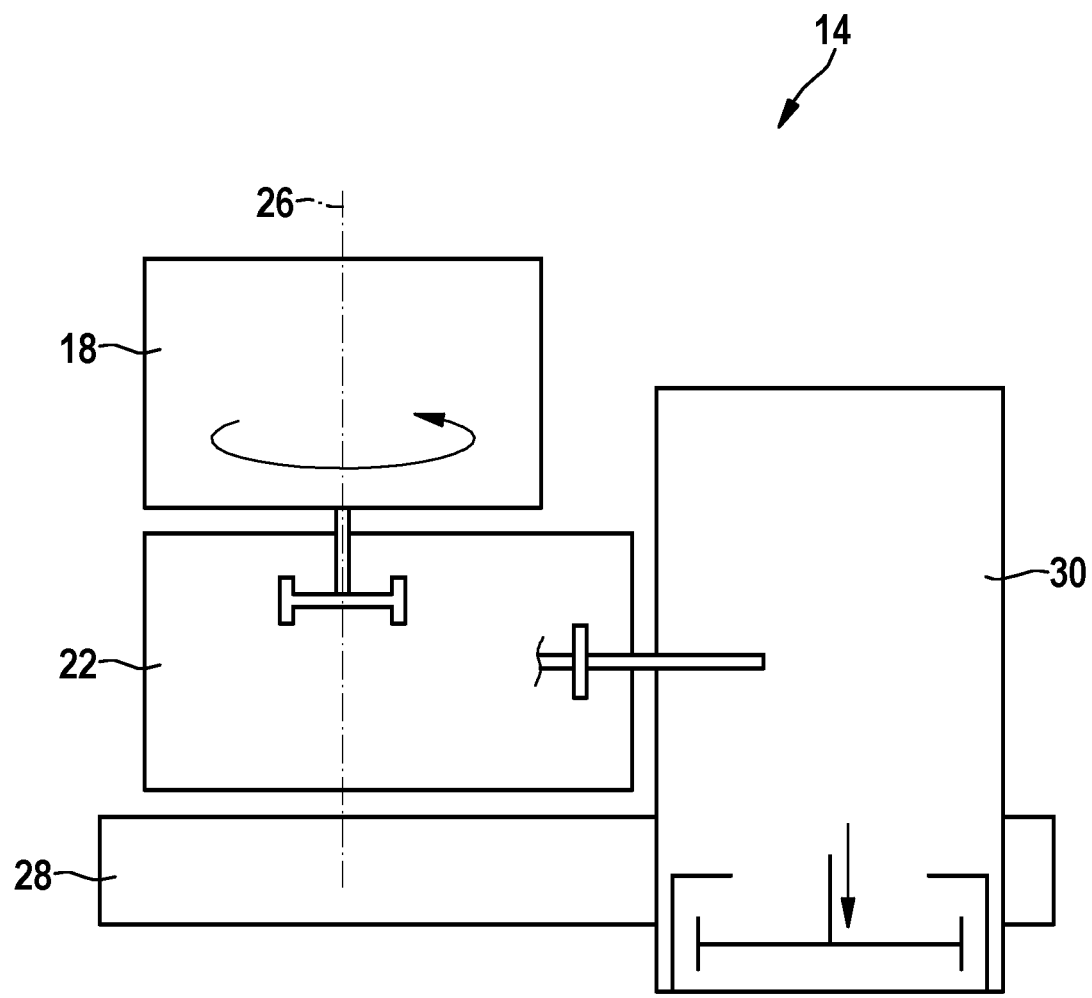
FIG. 1 shows a schematic illustration of one exemplary embodiment of a drive train of the electromechanical brake pressure generator according to the present invention.

FIG. 1 shows a schematic illustration of one exemplary embodiment of a drive train 14 of an electromechanical brake pressure generator according to the present invention. Drive train 14 includes an electric motor 18, via which an input speed may be generated. Electric motor 18 is mechanically connected to an input side of a planetary gear set 22. In this exemplary embodiment, planetary gear set 22 is positioned coaxially to an electric motor axis 26. Planetary gear set 22 is additionally situated at a housing part 28 of the brake pressure generator that may be a valve housing, for example.

Via planetary gear set 22 the input speed of electric motor 18 is converted into a slower speed. Planetary gear set 22 is mechanically connected to a hydraulic module 30 at an output side. Hydraulic module 30 may have a brake pressure piston that is movable via a spindle nut arrangement in the axial direction to generate brake pressure. Drive train 14 illustrated in this exemplary embodiment is situated biaxially; this means that hydraulic module 30 is situated in parallel to electric motor axis 26.

Figure 2:
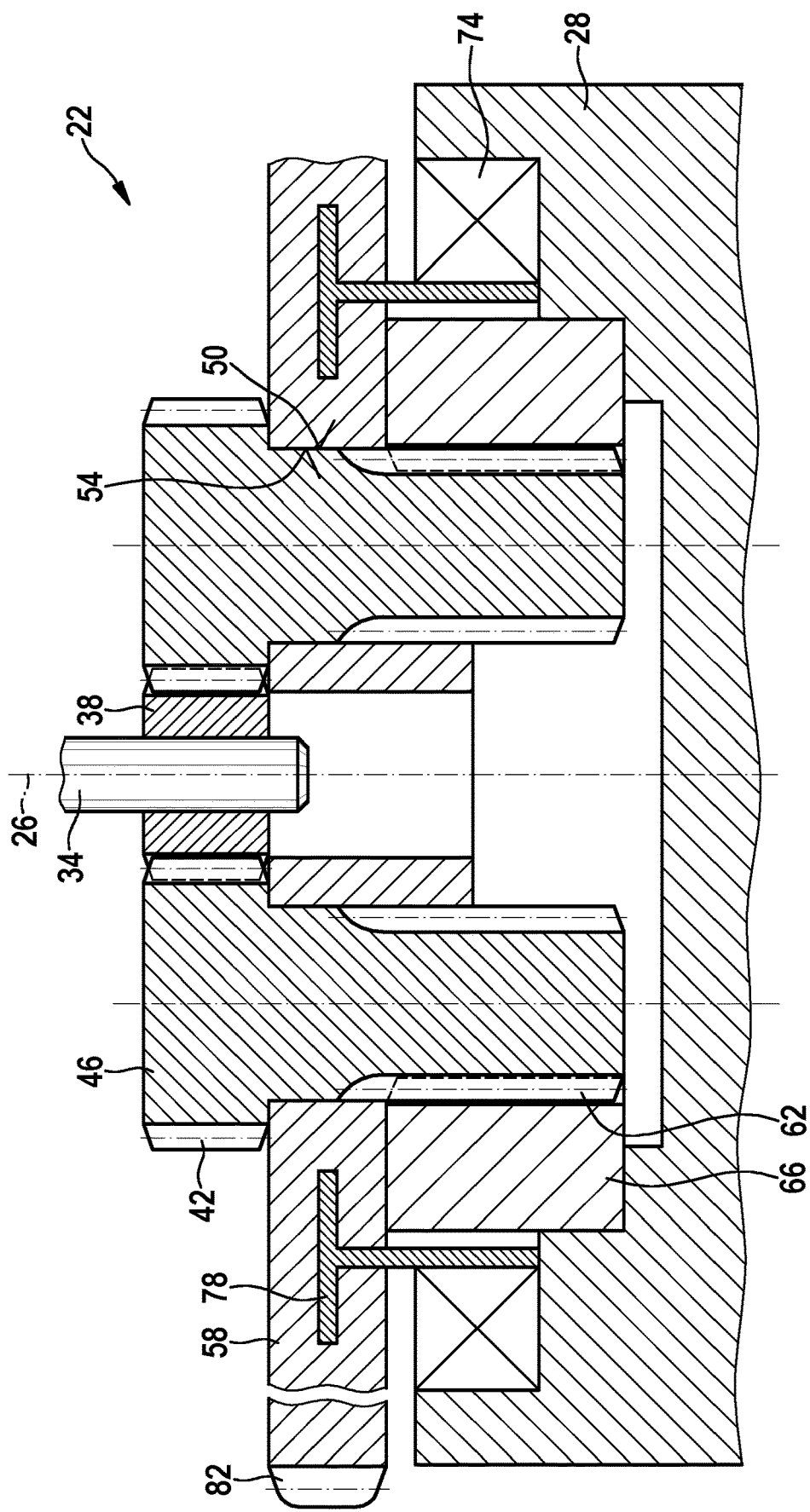
FIG. 2 shows a first exemplary embodiment of a planetary gear set of the electromechanical brake pressure generator according to the present invention.

FIG. 2 shows a first exemplary embodiment of a planetary gear set 22 of the electromechanical brake pressure generator according to the present invention. Planetary gear set 22 is connected via an electric motor shaft 34 to electric motor 18. At an end of electric motor shaft 34 a sun wheel 38 is rotatably fixedly situated, which is rotatable together with electric motor shaft 34. Sun wheel 38 is directly mechanically engaged with a first toothing area 42 of several stepped planets 46.

In this exemplary embodiment, stepped planets 46 have a bearing area 50, which is directly adjacent to first toothing area 46 and via which stepped planets 46 are rotatably mounted in a bore 54 of a planet carrier 58 in each case. In this way, no additional axle for mounting stepped planets 46 is necessary. In this exemplary embodiment, bearing area 50 and/or bore 54 is/are formed from a material that has a lubricating effect. Thus, no additional rolling or friction bearing is necessary for mounting stepped planets 46.

A second toothing area 62, which has a smaller diameter than first toothing area 42, is situated directly adjacent to bearing area 50. Moreover, second toothing area 62 has a smaller diameter than bearing area 50. In this way, an installation of stepped planets 46 in bores 54 is ensured. It is additionally ensured that an inner wall of bore 54 is not in contact with second toothing area 62.

Second toothing area 62 is directly engaged with an annulus gear 66, at which an inner toothing is formed. Annulus gear 66 is rotatably fixedly connected to housing part 28, which may be a valve housing of the brake pressure generator, for example.

Planet carrier 58 is mounted on the opposite side of housing part 28. Between planet carrier 58 and housing part 28, a bearing 74 is situated, via which planet carrier 58 is rotatable with regard to housing part 28. To directly mount planet carrier 58 with regard to housing part 28, planet carrier 58 has a planet carrier structural element 78, which is partially embedded in planet carrier 58, in this exemplary embodiment. Via planet carrier structural element 78, bearing loads may be received and distributed.

In this exemplary embodiment, planet carrier 58 is designed as an output component. For this purpose, planet carrier 58 includes a spur wheel 82, via which same is mechanically connected to hydraulic module 30.

FIG. 3 shows a second exemplary embodiment of a planetary gear set 22 of the electromechanical brake pressure generator according to the present invention. In contrast to the first exemplary embodiment shown in FIG. 2, stepped planets 46 are rotatably mounted via planet axles 86. Planet axles 86 are fixedly connected to housing part 28. In addition, stepped planets 46 do not have a bearing area 50. In this exemplary embodiment, second toothing area 62 is directly adjacent to larger first toothing area 46.

Annulus gear 66 has an inner toothing that is engaged with second toothing area 62 of stepped planets 46. In this exemplary embodiment, annulus gear 66 is rotatably mounted with regard to housing part 28 via a bearing 74. To directly mount annulus gear 66 with regard to housing part 28, annulus gear 66 has an annulus gear structural element 90, which is partially embedded in annulus gear 66, in this exemplary embodiment. Via annulus gear structural element 90, bearing loads may be received and distributed.

In contrast to the first exemplary embodiment, annulus gear 66 is designed as an output component in this exemplary embodiment. For this purpose, annulus gear 66 includes a spur wheel 82, via which same is mechanically connected to hydraulic module 30.

What is claimed is:

1. An electromechanically drivable brake pressure generator for a hydraulic braking system of a vehicle, comprising:
   an electric motor configured to generate an input speed,
   a planetary gear set driven by the electric motor on an input side of the planetary gear set the planetary gear set having a gear ratio to decrease the input speed; and
   a hydraulic module connected to the planetary gear set on an output side of the planetary gear set to generate a brake pressure;
   wherein the planetary gear set includes stepped planets that are connected to a sun wheel of the planetary gear set on the input side and to an output component of the planetary gear set on the output side, wherein the stepped planets are mounted in the electromechanically drivable brake pressure generator via planet axles that are fixedly connected to the electric motor or to a housing part of the electromechanically drivable brake pressure generator.

2. The electromechanically drivable brake pressure generator as recited in claim 1,
   wherein the output component is a planet carrier that accommodates the stepped planets.

3. The electromechanically drivable brake pressure generator as recited in claim 2,
   wherein the stepped planets have a bearing area via which they are mounted in bores of the planet carrier.

4. The electromechanically drivable brake pressure generator as recited in claim 1,
   wherein the output component is an annulus gear of the planetary gear set.

5. The electromechanically drivable brake pressure generator as recited in claim 4, wherein the stepped planets and/or a planet carrier and/or the annulus gear are formed from a plastic injection-molded material.

6. The electromechanically drivable brake pressure generator as recited in claim 1,
   wherein the output component is mounted via a bearing that is situated between a housing part and the output component.

7. The electromechanically drivable brake pressure generator as recited in claim 1, wherein the stepped planets and/or the sun wheel are formed from a sintered metal material.

8. An electromechanically drivable brake pressure generator for a hydraulic braking system of a vehicle, comprising:
   an electric motor configured to generate an input speed,
   a planetary gear set driven by the electric motor on an input side of the planetary gear set the planetary gear set having a gear ratio to decrease the input speed; and
   a hydraulic module connected to the planetary gear set on an output side of the planetary gear set to generate a brake pressure;
   wherein the planetary gear set includes stepped planets that are connected to a sun wheel of the planetary gear set on the input side and to an output component of the planetary gear set on the output side,
   wherein the output component is a spur wheel.

9. A vehicle, comprising:
   an electromechanically drivable brake pressure generator for a hydraulic braking system of the vehicle, including:
   an electric motor configured to generate an input speed,
   a planetary gear set driven by the electric motor on an input side of the planetary gear set the planetary gear set having a gear ratio to decrease of the input speed; and
   a hydraulic module connected to the planetary gear set on an output side of the planetary gear set to generate a brake pressure;
   wherein the planetary gear set includes stepped planets that are connected to a sun wheel of the planetary gear set on the input side and to an output component of the planetary gear set on the output side, wherein the stepped planets are mounted in the electromechanically drivable brake pressure generator via planet axles that are fixedly connected to the electric motor or to a housing part of the electromechanically drivable brake pressure generator.

* * * * *